(12) United States Patent
Park

(10) Patent No.: US 9,573,449 B2
(45) Date of Patent: Feb. 21, 2017

(54) POWER TRANSMISSION APPARATUS FOR VEHICLE SUNROOF

(71) Applicant: Hyundai Motor Company, Seoul (KR)

(72) Inventor: Hoo-Sang Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/860,267

(22) Filed: Sep. 21, 2015

(65) Prior Publication Data

US 2016/0152124 A1    Jun. 2, 2016

(30) Foreign Application Priority Data

Dec. 1, 2014 (KR) .......................... 10-2014-0169565

(51) Int. Cl.
*B60J 7/043* (2006.01)

(52) U.S. Cl.
CPC ..................................... *B60J 7/043* (2013.01)

(58) Field of Classification Search
CPC ............... B60J 7/043; B60J 7/057; B60J 7/00; B60J 7/05; B60J 7/053
USPC .................................. 136/244, 291; 206/211
See application file for complete search history.

(56) References Cited

U.S. PATENT DOCUMENTS

| | | | | |
|---|---|---|---|---|
| 5,261,722 A * | 11/1993 | Staley | ......................... | B60J 7/02 296/211 |
| 5,938,450 A * | 8/1999 | Nagafuji | .......... | H01R 13/65807 439/607.07 |
| 6,423,894 B1 * | 7/2002 | Patz | ........................... | B60J 7/00 136/244 |
| 6,475,040 B1 * | 11/2002 | Myer | ..................... | H01R 13/11 439/374 |
| 6,540,529 B1 * | 4/2003 | Yu | .......................... | H01R 13/28 439/284 |
| 7,976,326 B2 * | 7/2011 | Stoner | .................. | H01R 13/193 439/295 |
| 2013/0076078 A1 | 3/2013 | Ramdeo | | |

FOREIGN PATENT DOCUMENTS

| | | |
|---|---|---|
| JP | 5-310035 A | 11/1993 |
| JP | 7-1305 Y2 | 1/1995 |
| JP | 2675331 B2 | 7/1997 |
| KR | 20-2010-0012916 U | 12/2010 |
| KR | 10-1313899 B1 | 10/2013 |

* cited by examiner

*Primary Examiner* — Dennis H Pedder
(74) *Attorney, Agent, or Firm* — McDermott Will & Emery LLP

(57) ABSTRACT

A power transmission apparatus of a vehicle sunroof which uses a solar cell includes a sunroof glass that is slidably disposed on the roof of a vehicle, opens and closes an opening, and has a solar cell; upper transmission assemblies coupled to a support panel disposed around the sunroof glass and connected with the solar cell with a wire; first lower transmission assemblies that are coupled to the front portions of sunroof rails, disposed at both sides of the opening and come in contact with the upper transmission assemblies when the sunroof glass closes; and second lower transmission assemblies that are coupled to the rear portions of the sunroof rails and come in contact with the upper transmission assemblies when the sunroof glass opens. Accordingly, the apparatus can transmit power when the sunroof glass is both open and closed.

7 Claims, 6 Drawing Sheets

POWER TRANSMISSION APPARATUS FOR VEHICLE SUNROOF

CROSS-REFERENCE TO RELATED APPLICATIONS

This application claims the benefit of priority to Korean Patent Application No. 10-2014-169565, filed on Dec. 1, 2014, in the Korean Intellectual Property Office, the entire contents of which are incorporated herein by reference.

TECHNICAL FIELD

The present disclosure relates to a power transmission apparatus of a vehicle sunroof. More particularly, the present disclosure relates to a power transmission apparatus of a sunroof for a vehicle which can transmit power when a sunroof glass is both open and closed.

BACKGROUND

An opening may be formed through an automotive roof panel to discharge air from a vehicle or take external air into the vehicle. The opening may be opened or closed by a sunroof glass.

Most automotive sunroof panels are made of glass for an open feeling and an esthetic design. These sunroofs, which are formed to ventilate vehicles and provide an open feeling, undergo heat treatment to resist intensive sunlight, and are made of glass that effectively blocks ultraviolet rays and infrared rays in some cases. Further, they are often made of a high-strength material to protect passengers from fragments of glass in a collision.

A technology using solar cells for converting solar energy into electric energy has been proposed. Further, a technology for installing these solar cells on a roof panel or sunroof glass has been proposed.

However, a power transmission apparatus of a sunroof for a vehicle which uses a solar cell according to the related art directly transmits power generated by a solar cell on, or in, a sunroof glass. This arrangement may considerably restrict movement of the sunroof glass.

A sunroof glass is designed to open or close an opening of the roof of a vehicle by freely sliding forward and backward, but the power transmission system for an automotive sunroof according to the related art does not completely allow this movement. Accordingly, the solar cell cannot be fully used, or the movement of a sunroof glass is restricted in order to fully use the solar cell.

Most studies of an automotive sunroof using a solar cell according to the related art are focused on the solar cell panel itself, meaning the material, properties, and arrangement of a solar cell. Few studies are about a power transmission apparatus on a sunroof.

SUMMARY OF THE DISCLOSURE

The present disclosure provides a power transmission apparatus of a sunroof for a vehicle that can fully use a solar cell by transmitting power regardless of opening or closing a sunroof glass.

The present disclosure also provides a power transmission apparatus of a sunroof for a vehicle that can improve the commercial value of a vehicle because it can be used as a power source for a vehicle using a solar cell, yet allows free sliding of a sunroof glass.

The technical subjects to implement in the present disclosure are not limited to the technical problems described above and other technical subjects that are not stated herein will be clearly understood by those skilled in the art from the following specifications.

The present disclosure provides a power transmission apparatus of a sunroof for a vehicle that may include: a sunroof glass that is slidably disposed on the roof of a vehicle, opens and closes an opening, and has a solar cell; upper transmission assemblies that are coupled to a support panel disposed around the sunroof glass and are connected with the solar cell with a wire; first lower transmission assemblies that are coupled to the front portions of sunroof rails disposed at both sides of the opening and come in contact with the upper transmission assemblies when the sunroof glass closes; and second lower transmission assemblies that are coupled to the rear portions of the sunroof rails and come in contact with the upper transmission assemblies when the sunroof glass opens, such that power can be transmitted when the sunroof glass is both open and closed.

The upper transmission assembly may include: an upper bracket bolted to the front portion of the support panel; and an upper spring having one end coupled to the upper bracket and the other end curving down.

The upper spring may have a bending extension at the lower end which curves up to correspond to the shape of the upper end of the second lower transmission assembly and which comes into contact with the upper end of the second lower transmission assembly.

The first lower transmission assembly may include: a first lower bracket bolted to the front portion of the sunroof rail; a first lower spring that has a lower portion coupled to the first lower bracket and extends upward at an angle; and a first terminal coupled to the lower portion of the first lower spring.

The apparatus may further include a spring pad that is fitted on the first lower spring and comes into contact with the upper transmission assembly as the sunroof glass closes.

The second lower transmission assembly may further include: a second lower bracket bolted to the rear portion of the sunroof rail; a second lower spring that has a lower portion coupled to the second lower bracket and extends upward at an angle; and a second terminal coupled to the lower portion of the second lower spring.

The first lower transmission assembly and the second lower transmission assembly may be arranged on the sunroof rail to face each other in a symmetric arrangement.

The upper transmission assemblies may be disposed in a pair at both sides of the support panel, and the first lower transmission assemblies and the second lower transmission assemblies may be disposed in a pair on the sunroof rails.

The present disclosure having the configuration described above transmits power by bringing the upper transmission assemblies and the first lower transmission assemblies in contact with each other when the sunroof glass closes. Further, bringing the upper transmission assemblies and the second lower transmission assemblies in contact with each other when the sunroof glass opens allows power transmittal regardless of state of the sunroof glass.

Since the upper transmission assembly has a bending extension at the lower end which curves to correspond to the shape of the upper end of the second lower transmission assembly and comes fully in contact with the upper end of the second lower transmission assembly, power transmission is enabled even though the sunroof glass is open.

Since the spring pad is fitted on the first lower spring and comes into contact with the upper transmission assembly when the sunroof glass is closed, it is possible to reduce sparks due to contact between the upper transmission assembly and the first lower spring.

The apparatus includes a solar cell on the sunroof glass, which can be used as a power source for various parts of a vehicle and can freely slide with the sunroof glass. Therefore, the commercial value of the vehicle is increased.

DETAILED DESCRIPTION

Figure 1:
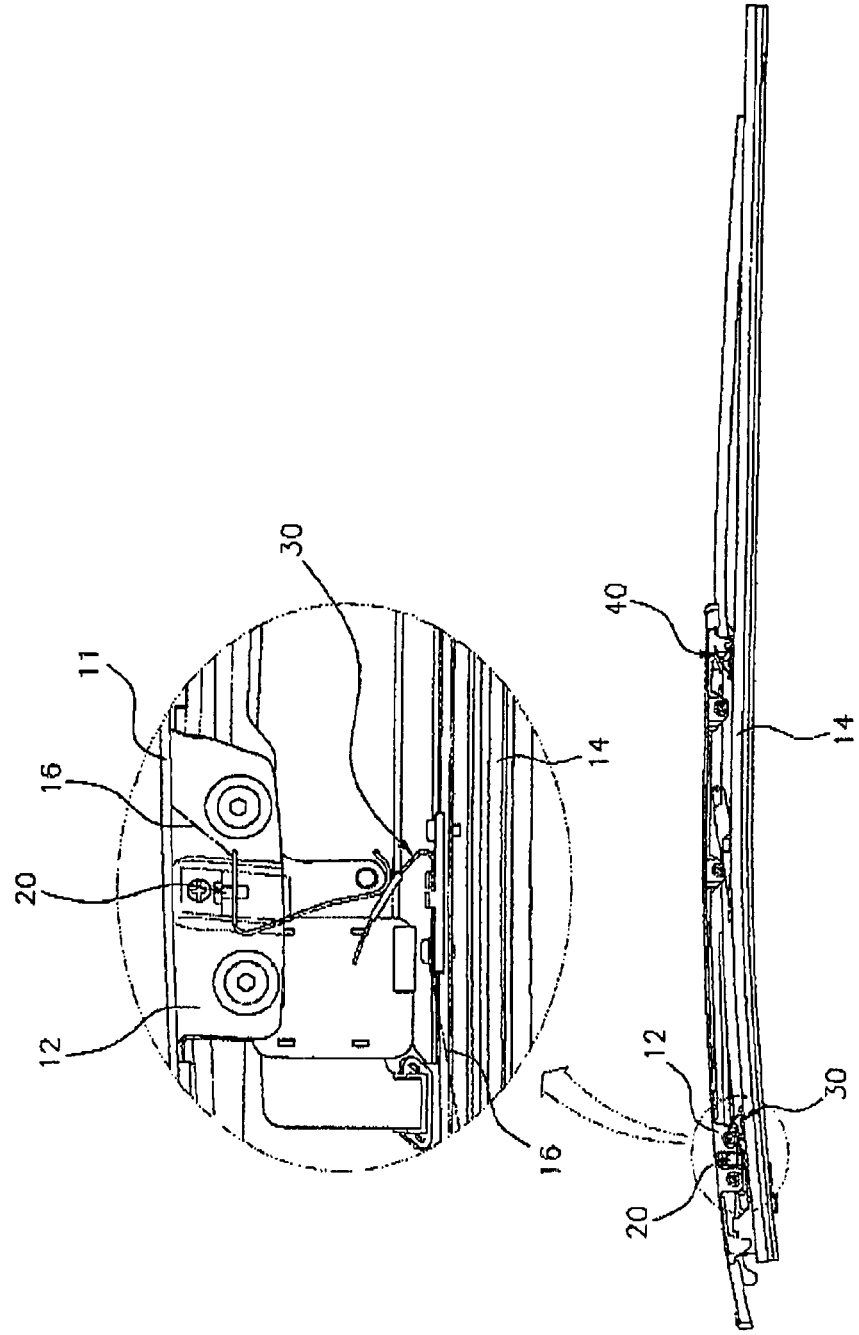
FIG. 1 provides a side view and an enlarged side view that illustrate a power transmission apparatus of a sunroof for a vehicle according to an embodiment of the present disclosure, with a sunroof glass open.

Hereinafter, exemplary embodiment of the present disclosure will be described in detail with reference to the accompanying drawings for those skilled in the art to be able to easily accomplish the present disclosure. However, the present disclosure may be achieved in various different ways and is not limited to the embodiments described herein.

In the accompanying drawings, parts not related to the description will be omitted in order to clearly describe the present disclosure, and like reference numerals will be used to describe like components throughout the specification.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the terms to describe most appropriately the best method he or she knows for carrying out the disclosure.

Figure 2:
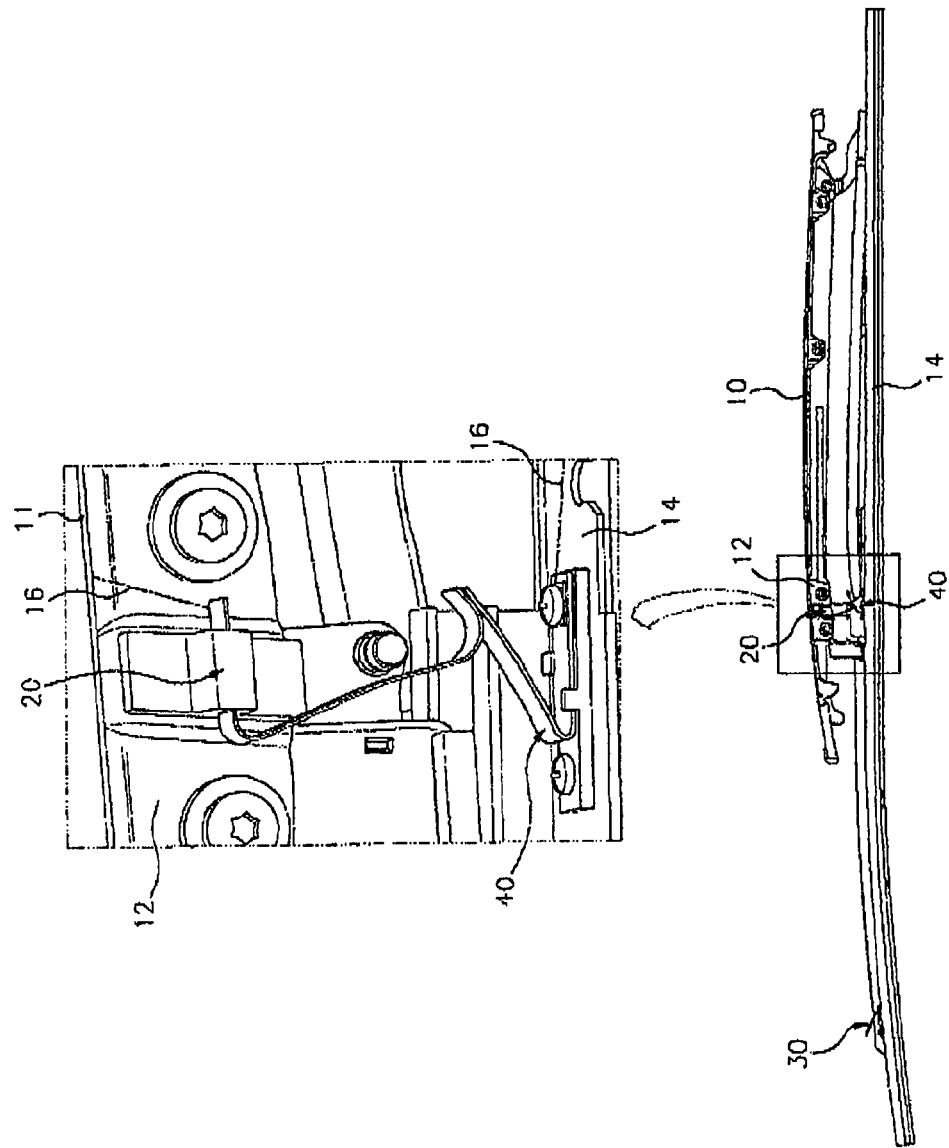
FIG. 2 provides a side view and an enlarged perspective view that illustrate the power transmission apparatus of a sunroof for a vehicle according to an embodiment of the present disclosure, with a sunroof glass closed.
Figure 3:
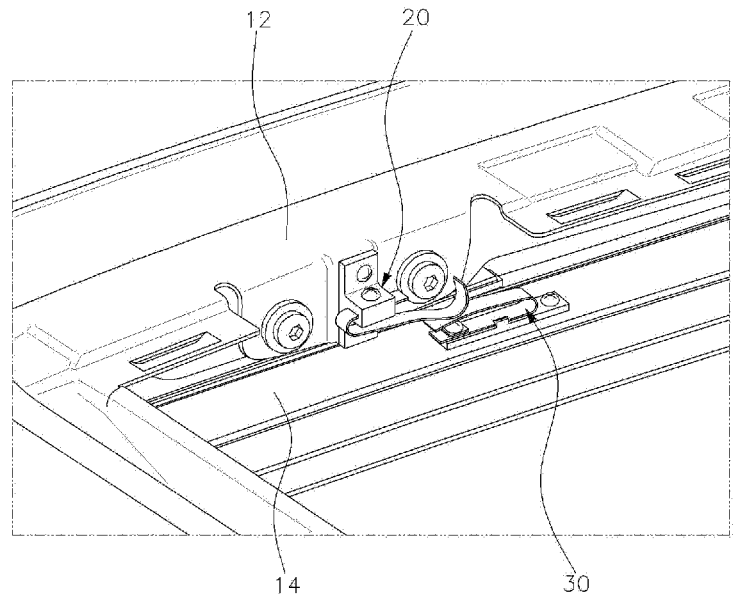
FIG. 3 is a perspective view illustrating an upper power transmission assembly and a first lower power transmission assembly according to an embodiment of the present disclosure.
Figure 4:
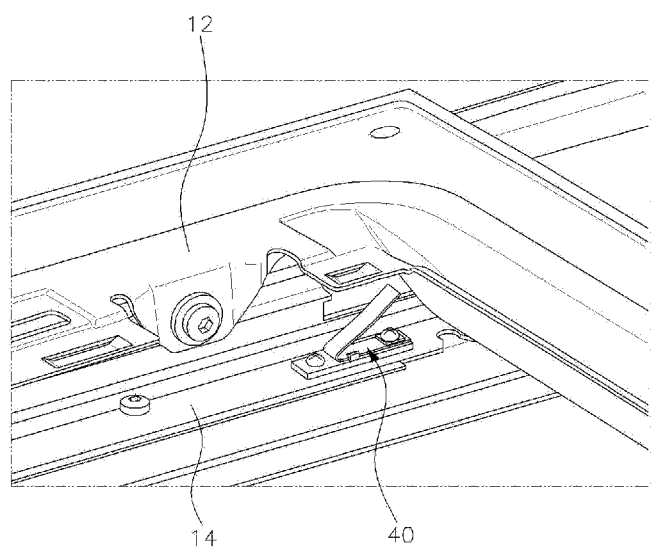
FIG. 4 is a perspective view illustrating a second lower power transmission assembly according to an embodiment of the present disclosure.

FIG. 1 provides a side view and an enlarged side view that illustrate a power transmission apparatus of a sunroof for a vehicle according to an embodiment of the present disclosure, with a sunroof glass open. FIG. 2 provides a side view and an enlarged perspective view that illustrate the power transmission apparatus of a sunroof for a vehicle according to an embodiment of the present disclosure, with a sunroof glass closed. FIG. 3 is a perspective view illustrating an upper power transmission assembly and a first lower power transmission assembly according to an embodiment of the present disclosure. FIG. 4 is a perspective view illustrating a second lower power transmission assembly according to an embodiment of the present disclosure.

As illustrated in the figures, a sunroof glass 10 capable of sliding forward and backward is installed on the roof of a vehicle and ventilates the vehicle interior. The sunroof glass 10 gives open feeling inside the vehicle by opening and closing an opening of the roof.

The sunroof glass 10 is operated in various ways, such as being slid forward and backward by a driving unit such as a motor (not illustrated) or tilted up and down. The detailed technical features of those operation types have been disclosed in various documents, and the detailed description is not provided herein.

The sunroof glass 10 may be made of a material that can effectively block ultraviolet rays and infrared rays. The sunroof glass 10 may be made of transparent glass, opaque glass or synthetic resin.

A solar cell 11 may be installed on the sunroof glass 10 and may be used to convert solar energy into electrical energy. This energy may then supply various parts (for example a BCM, a blower fan, and a battery) requiring power in a vehicle.

A semiconductor device using a photoelectric effect is generally used for such a solar cell. Solar cells may be installed on a portion of, or throughout, the sunroof glass 10, or a sunroof glass itself may be a transparent solar cell.

A support panel 12 may be disposed around the sunroof glass 10 to support it, and sunroof rails 14 may be longitudinally disposed around an opening of a vehicle and guide the sunroof glass opening and closing.

An upper transmission assembly 20 connected with the solar cell 11 with a wire 16 (indicated by a dashed dotted line in the figures) may be coupled to the front portion of the support panel 12 so electrical energy converted by the solar cell 11 may be transmitted through the upper transmission assembly 20.

As illustrated in FIGS. 1 and 3, a first lower transmission assembly 30 may be coupled to the front portion of the sunroof rail 14. Accordingly, when the sunroof glass 10 closes, the first lower transmission assembly 30 comes into contact with the upper transmission assembly 20 and receives electrical energy from the upper transmission assembly 20.

As illustrated in FIGS. 2 and 4, a second lower transmission assembly 40 may be coupled to the rear portion of the sunroof rail 14. When the sunroof glass 10 opens, the second lower transmission assembly 40 comes into contact with the upper transmission assembly 20 and receives electrical energy from the upper transmission assembly 20.

When the sunroof glass 10 is closed, the electrical energy converted by the solar cell may be transmitted through the upper transmission assembly 20 and the first lower transmission assembly 30. When the sunroof glass 10 is open, the electrical energy converted by the solar cell may be transmitted through the upper transmission assembly 20 and the second lower transmission assembly 40 to various parts requiring power in a vehicle.

A pair of upper transmission assemblies 20 may be mounted to face each other. The left and right sides of the support panel 12, and the first lower transmission assemblies 30 and the second lower transmission assemblies 40 may be disposed in a pair at both sides, or the left and right sides, of the sunroof rail 14.

Although only the upper transmission assembly 20, the first lower transmission assembly 30, and the second lower transmission assembly 40 mounted on a side of the support panel 12 and a side of the sunroof rail 14 are illustrated in the figures, it will be understood by those skilled in the art that another upper transmission assembly, first lower transmission assembly, and second lower transmission assembly may be mounted on the other sides of the support panel and the sunroof rail in the same or a similar way.

The first lower transmission assembly 30 and the second lower transmission assembly 40 may be arranged to face each other on the sunroof rail 14 in a symmetric arrangement.

The first lower transmission assembly 30 may be formed in a >- shape at the front portion of the sunroof rail 14. The second lower transmission assembly 40 may be formed in a <- shape at the lower portion of the sunroof rail 14, and they are arranged in a symmetric arrangement.

Figure 5A:
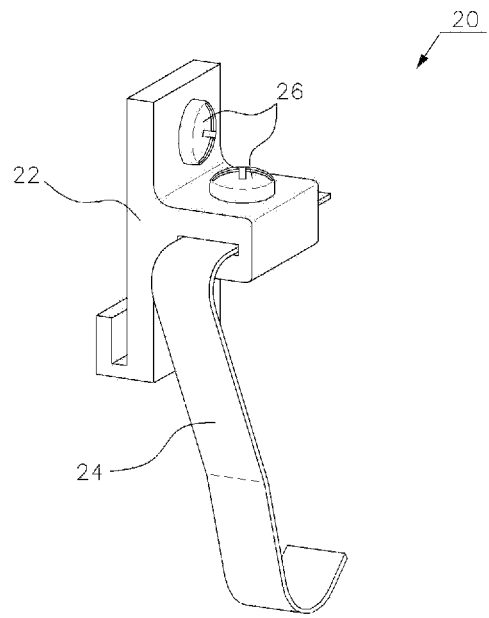
FIG. 5A is a perspective view illustrating the upper power transmission assembly according to an embodiment of the present disclosure.
Figure 5B:
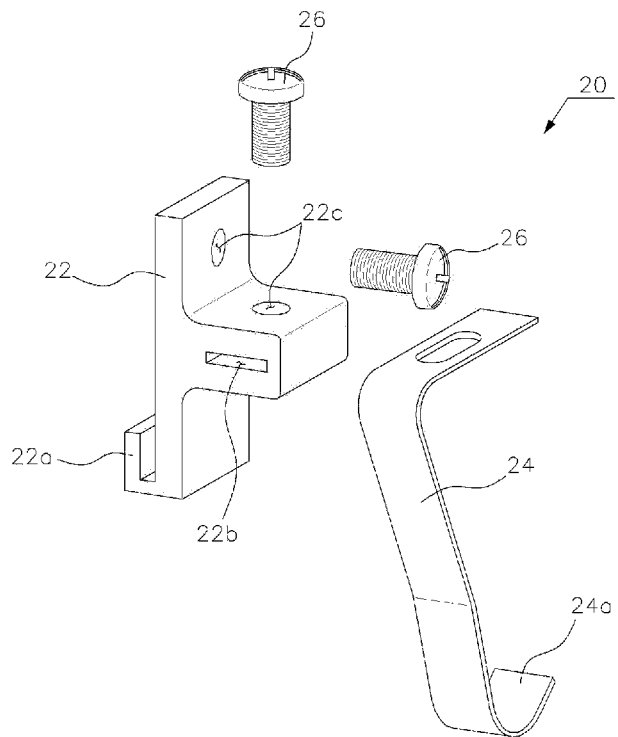
FIG. 5B is an exploded view illustrating the upper power transmission assembly according to an embodiment of the present disclosure.
Figure 6A:
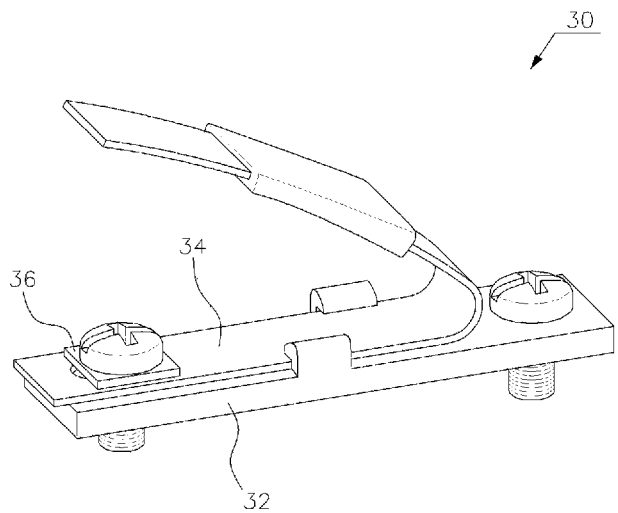
FIG. 6A is a perspective view illustrating the first lower power transmission assembly according to an embodiment of the present disclosure.
Figure 6B:
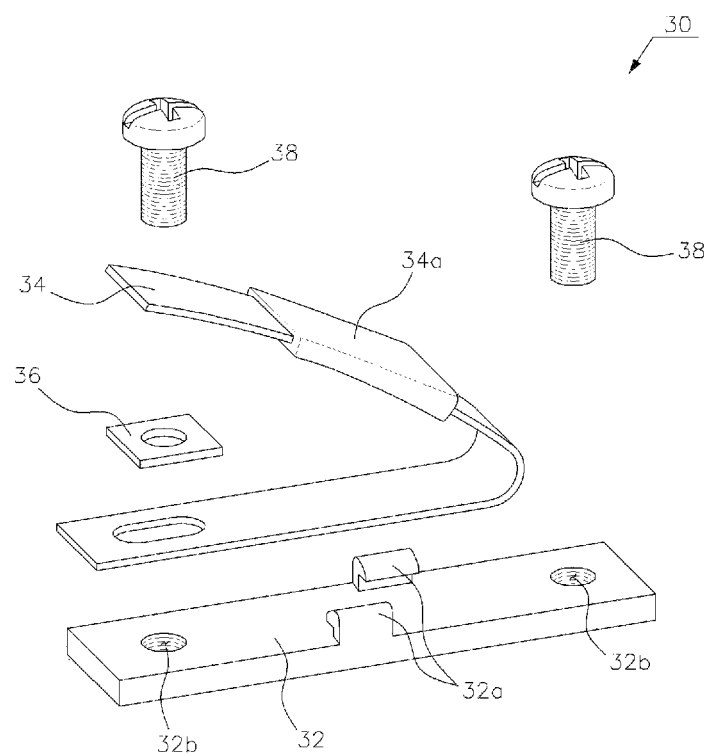
FIG. 6B is an exploded view illustrating the first lower power transmission assembly according to an embodiment of the present disclosure.
Figure 7A:
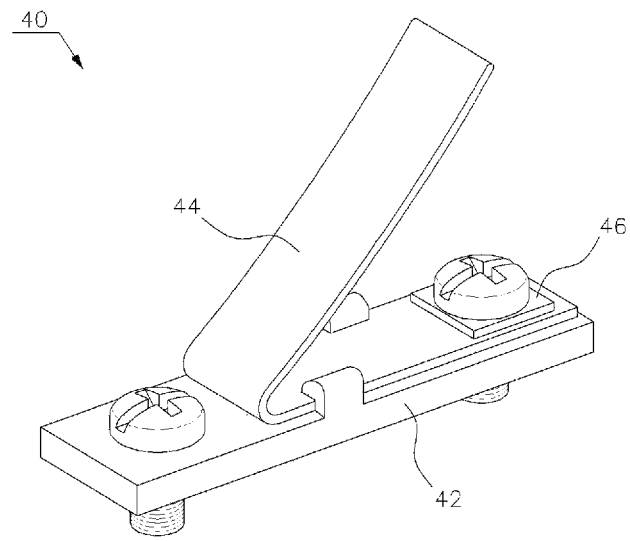
FIG. 7A is a perspective view illustrating the second lower power transmission assembly according to an embodiment of the present disclosure.
Figure 7B:
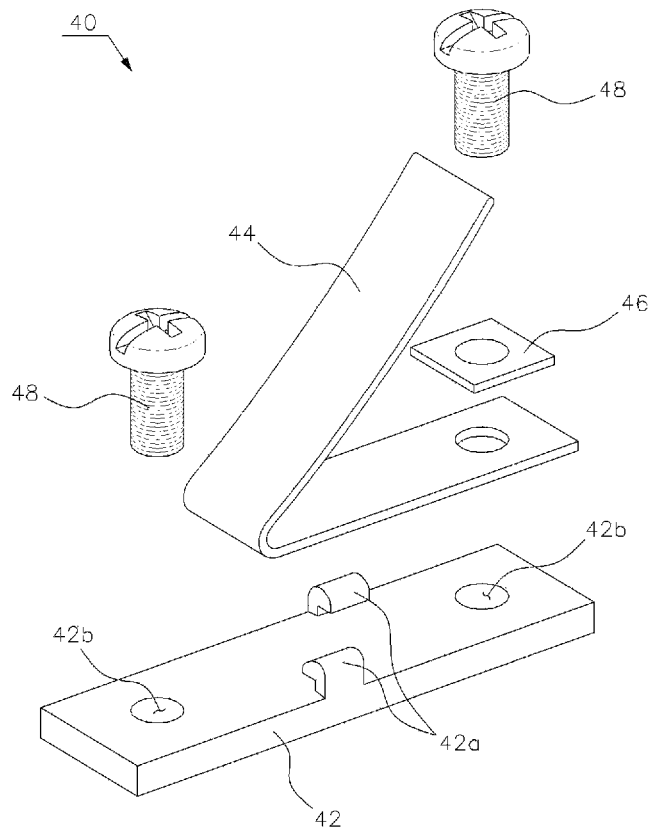
FIG. 7B is an exploded view illustrating the second lower power transmission assembly according to an embodiment of the present disclosure.

FIGS. 5A and 5B are a perspective view and an exploded view, respectively, illustrating the upper transmission assembly according to an embodiment of the present disclosure. FIGS. 6A and 6B are a perspective view and an exploded view, respectively, illustrating the first lower transmission assembly according to an embodiment of the present disclosure. FIGS. 7A and 7B are a perspective view and an exploded view, respectively, illustrating the second lower transmission assembly according to an embodiment of the present disclosure.

As illustrated in FIGS. 5A and 5B, the upper transmission assembly 20 may include an upper bracket 22 bolted to the front portion of the support panel 12 and an upper spring 24 having one end coupled to the upper bracket and the other end curving down.

A fixing portion 22a may be formed on the rear side of the upper bracket 22 to be fitted on the support panel 12. An insertion hole 22b may be formed on the front side of the upper bracket 22 to receive the upper spring 24.

Two upper bolt holes 22c are formed at the upper bracket 22, one of which is provided for coupling the upper bracket 22 and the support panel 12 with an upper bolt 26 and the other is provided for coupling the upper bracket 22 and the upper spring 24.

The entire shape of the upper spring 24 is an inversed L-shape curving down, and it may be made from bendable steel for electrical conduction.

As illustrated FIG. 2, and in other figures, the upper spring 24 has a bending extension 24a at the lower end which curves up to correspond to the shape of the upper end of the second lower transmission assembly 40. Further, the bending extension 24a comes fully into contact with the upper end of the second lower transmission assembly 40.

As the bending extension 24a of the upper spring 24 comes fully in contact with the second lower transmission assembly 40, it enables the electrical energy produced by the solar cell to be transmitted with the sunroof glass 10 open.

As illustrated in FIGS. 6A and 6B, the first lower transmission assembly 30 may include a first lower bracket 23 bolted to the front portion of the sunroof rail 14, a first lower spring 34 that has a lower portion coupled to the first lower bracket 32 and extends upward at an angle, and a first terminal 36 that is coupled to the lower portion of the first lower spring 34.

The first lower bracket 32 has two first lower bolt holes 32b, one of which is provided for coupling the first lower bracket 32 and the sunroof rail 14 with first lower bolts 38 and the other is provided for coupling the first lower bracket 32 and the first lower spring 34.

The first lower bracket 32 has a plurality of hooks 32a, so the first lower spring 34 is locked to be vertically retained by the first hooks 32a.

The entire shape of the first lower spring 34 is a >- shape curving up at an angle, and the first lower spring 34 may be made of bendable steel for electrical conduction.

The first terminal 36 fastened to the first lower spring 34 by one of the first lower bolts 38 is provided to easily connect the wire 16 that connects the first lower spring 34 to various parts (for example a BCM and a blower fan) requiring power in a vehicle.

As illustrated in FIG. 1, and other figures, the first lower spring 34 may be equipped with a spring pad 34a and the spring pad 34a may function as a contact point that comes into contact with the upper transmission assembly 20 as the sunroof glass 10 closes.

As the sunroof glass 10 closes, the upper transmission assembly 20 slowly moves forward, comes into contact with the spring pad 34a, and then further moves over the spring pad 34a, as illustrated in FIG. 3. The spring pad 34a may reduce sparks between the upper spring 24 and the first lower spring 34.

As illustrated in FIGS. 7A and 7B, the second lower transmission assembly 40 may include a second lower bracket 42 bolted to the rear portion of the sunroof rail 14, a second lower spring 44 that has a lower portion coupled to the second lower bracket 42 and extends upward at an angle, and a second terminal 46 coupled to the lower portion of the second lower spring 44.

Similar to the first lower bracket 32, the second lower bracket 42 has two second lower bolt holes 42b for receiving second lower bolts 48 and a plurality of second hooks 42a for retaining the second lower spring 44.

The second terminal 46 may be fastened to the second lower spring 44 by one of the second lower bolts 48. Similar to the first lower spring 34, the second lower spring 44 may be made of a bendable steel member having a <- shape.

The second lower transmission assemblies 40 may be arranged in a symmetric arrangement, similar to the first lower transmission assemblies 30, except that they come in contact with the upper transmission assemblies 20, when the sunroof glass 10 opens.

It will be apparent to those skilled in the art that the foregoing present disclosure is not limited by the foregoing embodiments and the accompanying drawings, and various modifications and changes may be made without departing from the scope and spirit of the disclosure.

What is claimed is:
1. A power transmission apparatus of a vehicle sunroof, comprising:
   a sunroof glass slidably disposed on the roof of a vehicle, the sunroof glass opening and closing an opening and further including a solar cell;
   upper transmission assemblies coupled to a support panel disposed around the sunroof glass and connected to the solar cell with a wire;
   first lower transmission assemblies that are coupled to the front portions of sunroof rails disposed at both sides of the opening and come in contact with the upper transmission assemblies when the sunroof glass closes; and second lower transmission assemblies that are coupled to the rear portions of the sunroof rails and come in contact with the upper transmission assemblies when the sunroof glass opens, wherein the upper transmission assembly includes an upper bracket bolted to the front portion of the support panel and an upper spring having one end coupled to the upper bracket and the other end curving down, and wherein two upper bolt holes are formed at the upper bracket, one of which is provided for coupling the upper bracket and the support panel with an upper bolt and the other is provided for coupling the upper bracket and the upper spring.

2. The apparatus of claim 1, wherein the upper spring has a bending extension at the lower end which curves up to the upper end of the second lower transmission assembly, and which comes fully into contact with the upper end of the second lower transmission assembly.

3. The apparatus of claim 1, wherein the first lower transmission assembly includes:
 a first lower bracket bolted to the front portion of the sunroof rail;
 a first lower spring having a lower portion coupled to the first lower bracket and extending upward at an angle; and
 a first terminal coupled to the lower portion of the first lower spring.

4. The apparatus of claim 3, further comprising:
 a spring pad that is fitted on the first lower spring and comes in contact with the upper transmission assembly as the sunroof glass closes.

5. The apparatus of claim 1, wherein the second lower transmission assembly includes:
 a second lower bracket bolted to the rear portion of the sunroof rail;
 a second lower spring having a lower portion coupled to the second lower bracket and extending upward at an angle; and
 a second terminal coupled to the lower portion of the second lower spring.

6. The apparatus of claim 1, wherein the first lower transmission assembly and the second lower transmission assembly are arranged on the sunroof rail to face each other in a symmetric arrangement.

7. The apparatus of claim 1, wherein the upper transmission assemblies are disposed at both sides of the support panel, and the first lower transmission assemblies are disposed on the sunroof rails.

* * * * *